(No Model.) 6 Sheets—Sheet 2.
T. E. JEFFERSON.
Plow.
No. 230,419. Patented July 27, 1880.
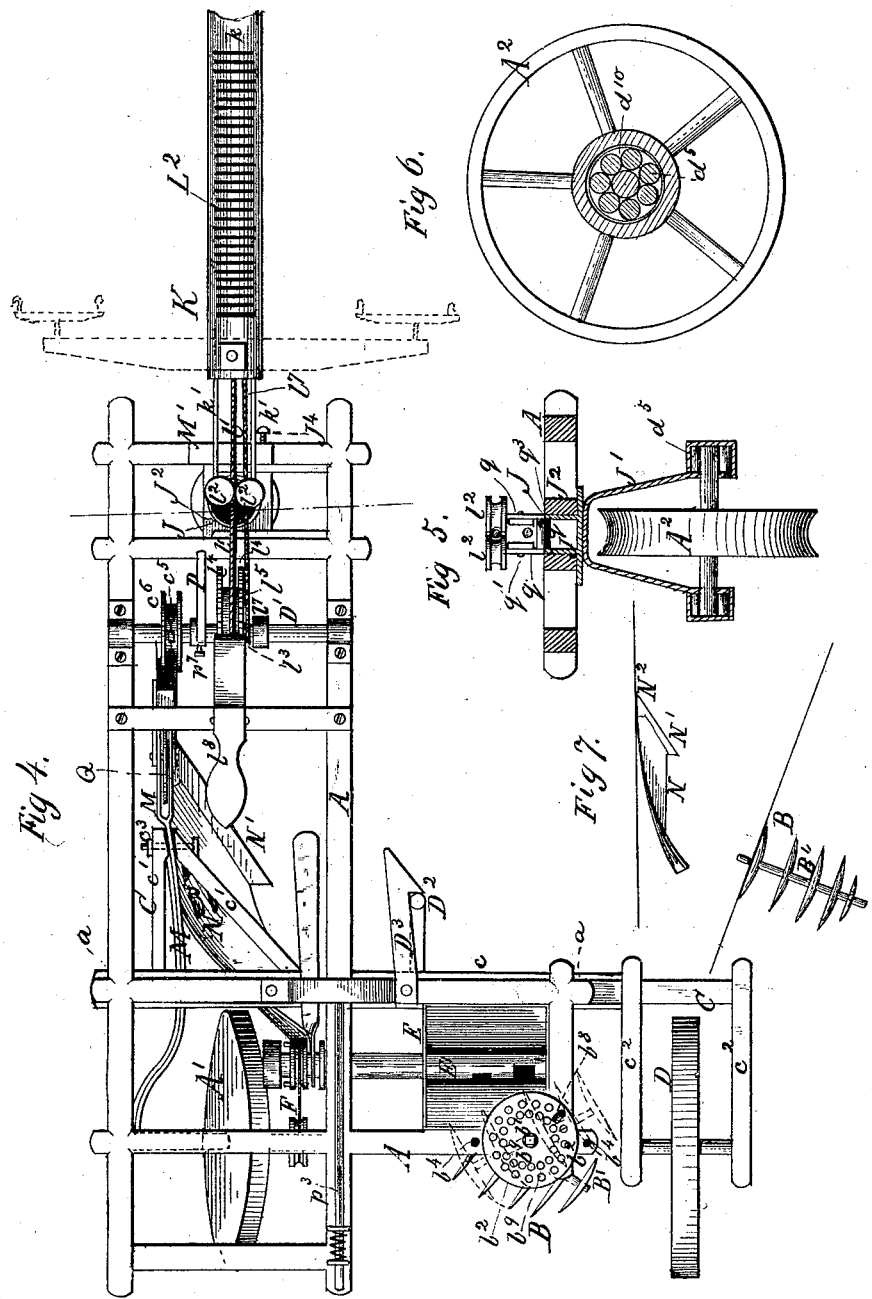
Witnesses:
J. Walter Fowler,
J. P. Theo. Lang.
Inventor;
Thos. E. Jefferson

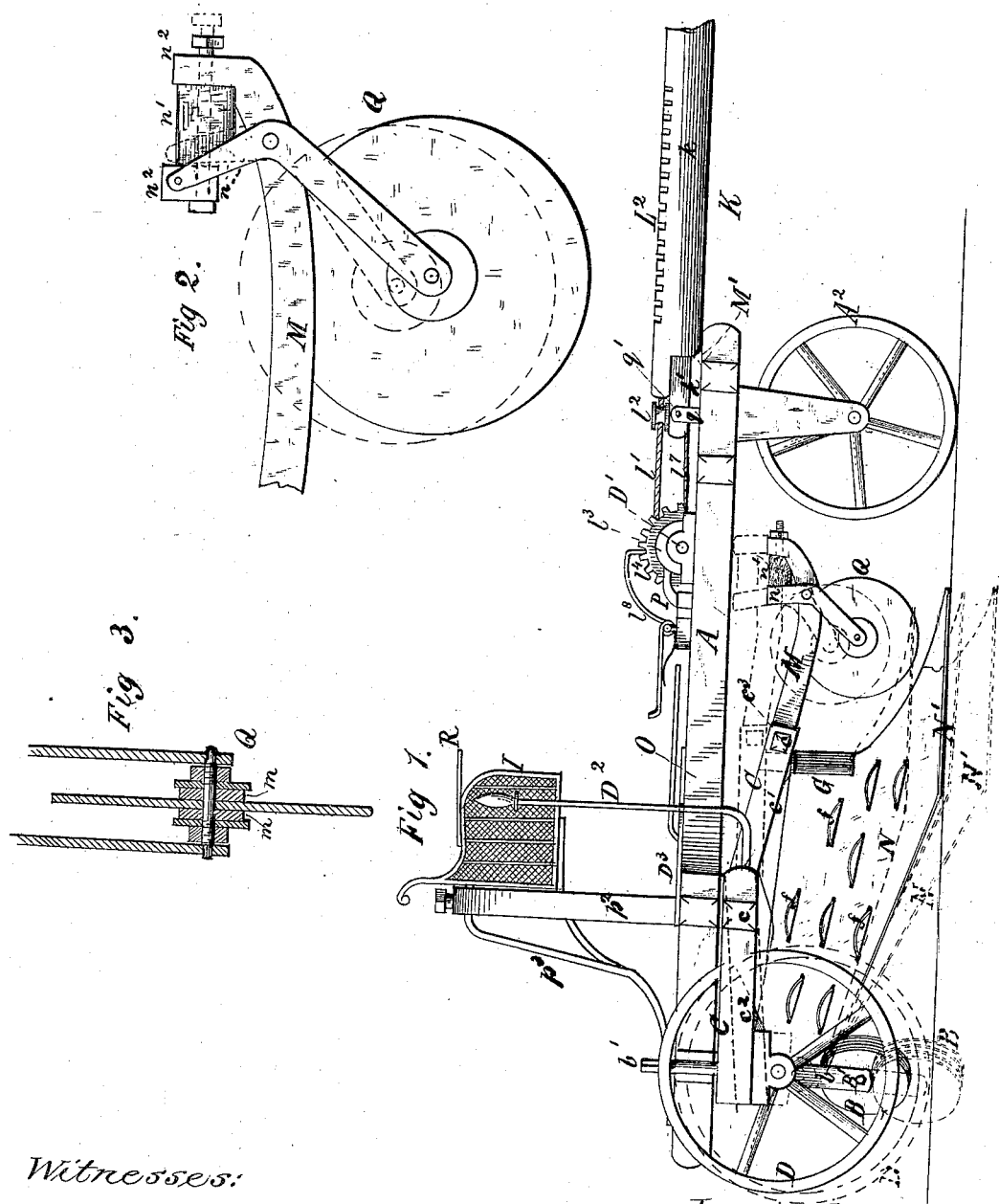

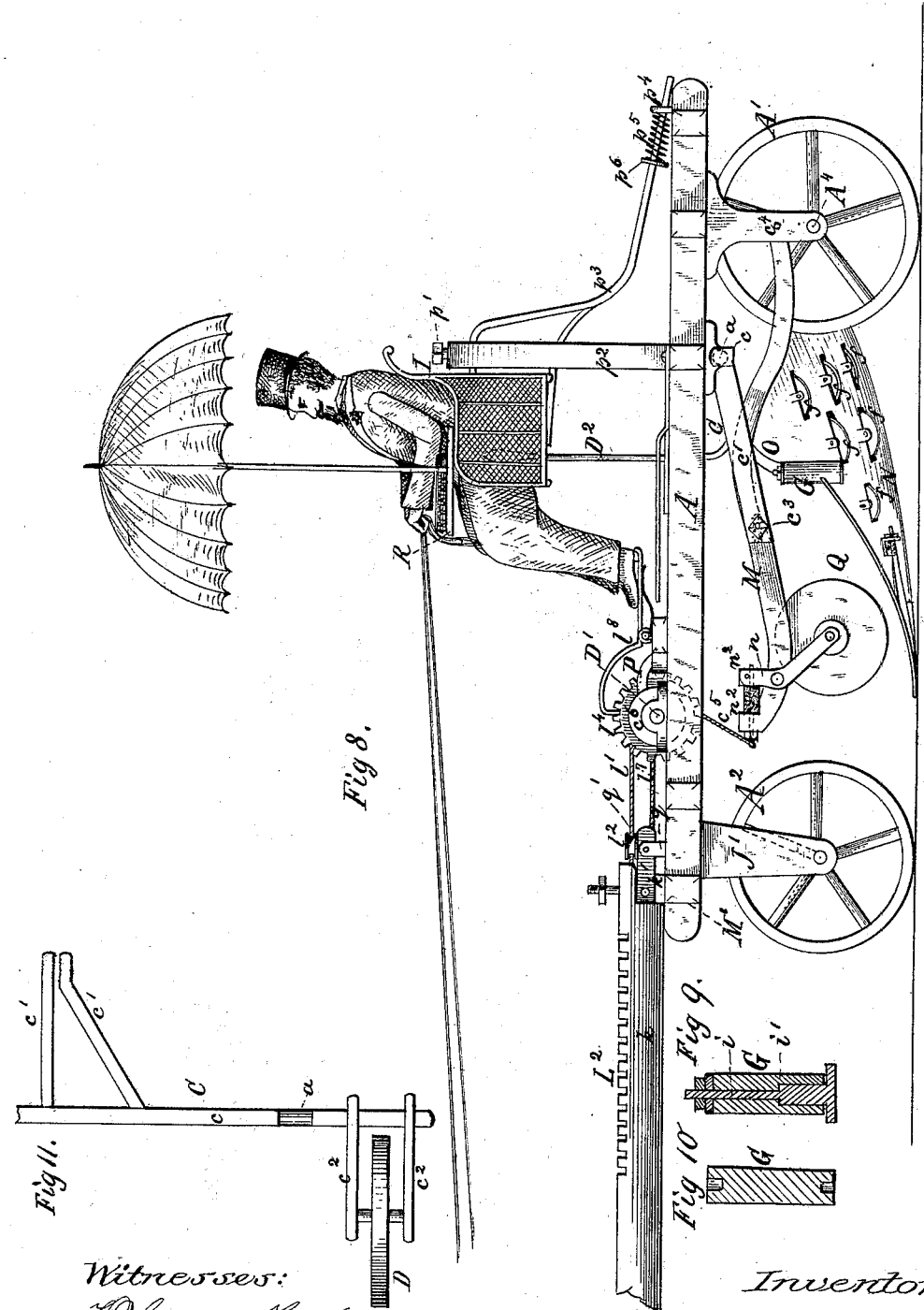

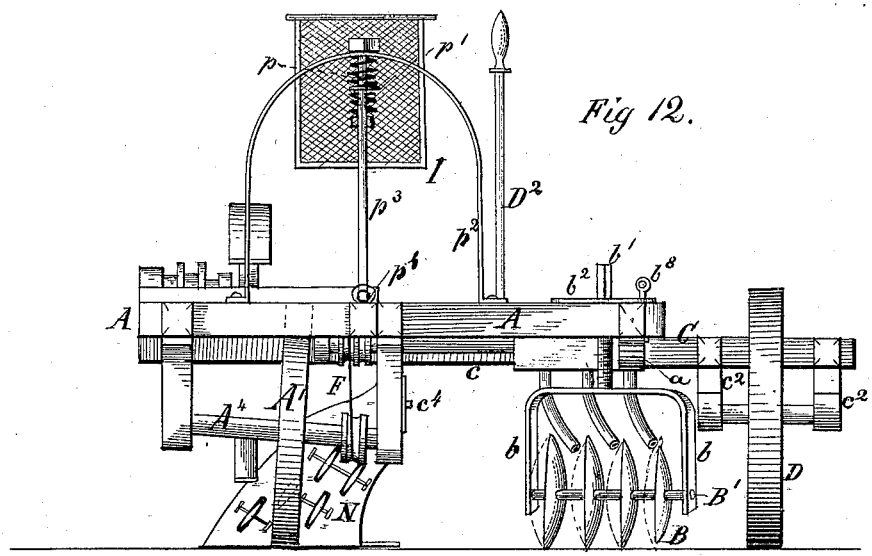

(No Model.)  
T. E. JEFFERSON.  
Plow.  
No. 230,419. Patented July 27, 1880.
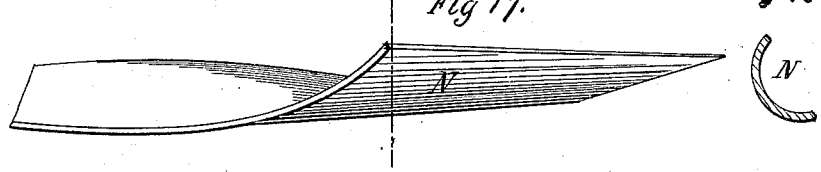
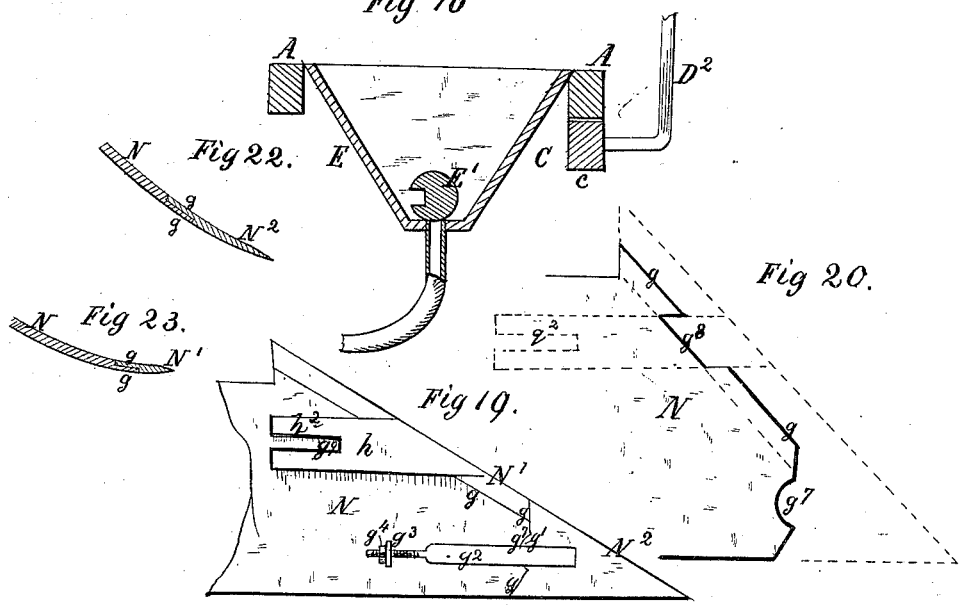
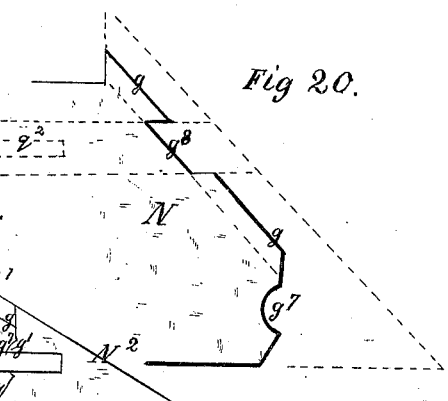
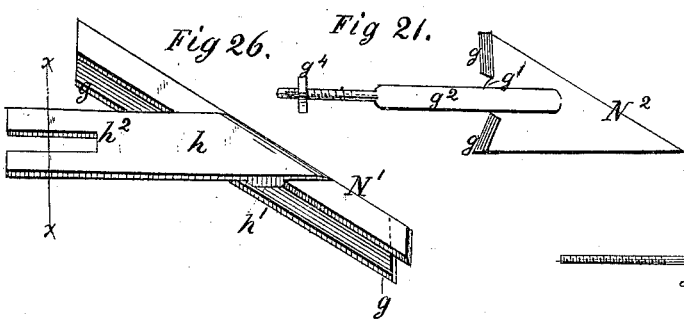
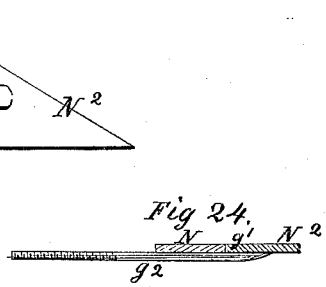
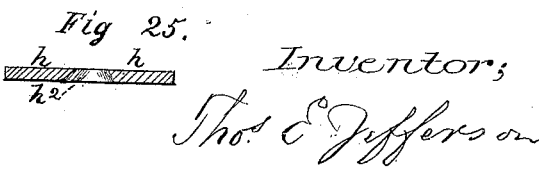
Witnesses:  
J. Walter Fowler,  
J. P. Theo. Lang.
Inventor;  
Thos. E. Jefferson
N. PETERS, PHOTO-LITHOGRAPHER, WASHINGTON, D.C.

(No Model.) 6 Sheets—Sheet 6.
T. E. JEFFERSON.
Plow.
No. 230,419. Patented July 27, 1880.
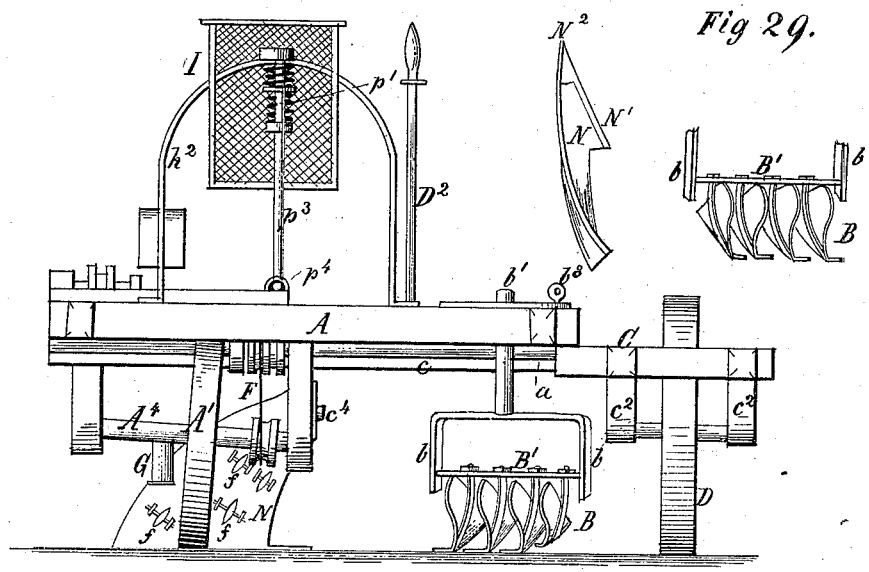
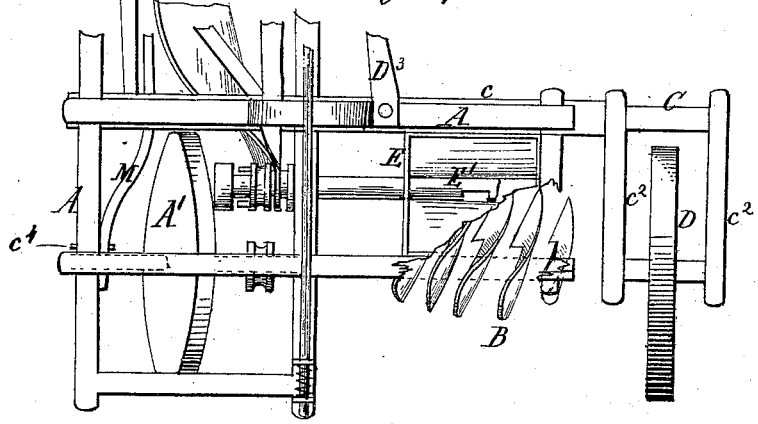
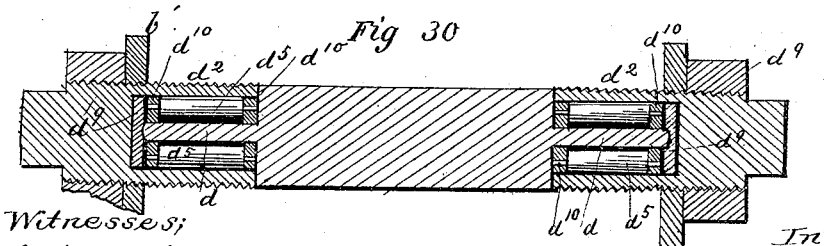
Witnesses:
J. Walter Fowler,
J. P. Theo. Lane.
Inventor:
Thos. E. Jefferson

UNITED STATES PATENT OFFICE.

THOMAS E. JEFFERSON, OF BOSTON, MASSACHUSETTS.

PLOW.

SPECIFICATION forming part of Letters Patent No. 230,419, dated July 27, 1880.

Application filed June 17, 1880. (No model.)

*To all whom it may concern:*

Be it known that I, THOMAS E. JEFFERSON, a citizen of the United States, residing at Boston, in the county of Suffolk and State of Massachusetts, have invented certain new and useful Improvements in Plows, of which the following is a specification.

The object of my invention is to provide a simple and practical implement for plowing, inverting, and harrowing, or cultivating the soil, and when desirable planting seed, such implement operating with a minimum amount of friction, wear and tear, and requiring little labor for the driver and team, and at the same time overcoming the landside-pressure of the mold-board; and the means employed for effecting this object are utilized for harrowing or cultivating the soil to a depth less than that of the furrows plowed, such harrowing or cultivation of the plowed land being performed simultaneously with the plowing operation; and the nature of my improvements will be fully understood from the following description and accompanying drawings, in which—

Figure 1 is a side elevation of the plow complete, viewed from the furrow-side. The full black lines show the plow in its raised position, and the dotted lines show it in its lowered position. Fig. 2 is a detail view of the colter and a portion of the plow-beam. Fig. 3 is a detail sectional view of the colter blade or disk and its hanger. Fig. 4 is a plan view, a portion of the tongue or pole being broken off and the driver's seat removed. Fig. 5 is a vertical cross-section of the front supporting-wheel and its connections, and also of the front end of the plow-frame. Fig. 6 is a section through one of the bearing-boxes of the front supporting-wheel. Fig. 7 is a plan-view diagram, illustrating the relation of the oblique cutting wheels or disks to the landside of the plow. Fig. 8 is a similar elevation to Fig. 1, but showing the landside instead of the furrow side of the plow. Fig. 9 is a vertical detail section of the friction-roller at the front of the standard of the mold-board. Fig. 10 is another plan of making this roller. Fig. 11 is a detail plan view of the auxiliary-frame upon which the furrow-supporting wheel is applied, and by which the mold-board or plow is raised and lowered. Fig. 12 is a rear elevation of Fig. 8. Fig. 13 is a longitudinal section of the bearings for the revolving cutting disks or wheels which are employed upon the mold-board, such bearings or equivalents thereof being also employed in connection with the shafts of all the revolving parts of a plow. Fig. 14 is a detail elevation of one of the circles of friction-rollers shown in Fig. 13. Fig. 15 is a detail longitudinal section of a portion of the draft mechanism for raising and lowering a plow. Fig. 16 is a detail cross-section of the plow-frames and seed-distributing mechanism. Fig. 17 is a detail view of the mold-board, viewed from the furrow side and partially inverted. Fig. 18 is a cross-section of the same. Figs. 19, 20, 21, 22, 23, 24, 25, and 26 are views of an improved means for uniting the mold-board, share, and point. Fig. 27 is a partial or broken plan view, illustrating harrowing or cultivating teeth applied in the adjustable bearing or hanger and set to throw the soil toward the mold-board, and for relieving the plow of landside-pressure, and at the same time harrowing or cultivating at a less depth than the furrows plowed the soil which is plowed and turned over. Fig. 28 is a rear view of Fig. 27. Fig. 29 is a diagram illustrating the harrowing-teeth reversed in position, and thus adapted for simply breaking up the plowed soil and aiding in inverting the same, and thereby performing a like operation to that of the circular disks or wheels when they are reversed, as shown by dotted lines in Fig. 4. Fig. 30 is another plan of constructing the anti-friction bearings and shaft shown in Fig. 13.

Similar letters of reference in the several figures indicate similar parts.

The main frame A may be of rectangular form, as shown, or of any other suitable shape. It rests upon two wheels, A' A², connected directly to it, and upon a series of circular revolving cutting disks or wheels, as at B in Fig. 1, or upon harrowing or cultivating teeth, as at B in Fig. 28, or upon equivalent harrowing or cultivating contrivances, which harrow or cultivate the plowed soil to a depth less than the furrows plowed, and also are connected directly to the said frame. To the said main frame A an auxiliary frame, C, is hinged or pivoted at *a*. This auxiliary frame consists of a long transverse bar, *c*, forwardly-extending lever-arms $c'$, and rearwardly-extending lever and bearing arms $c^2$, as shown in Fig. 11. To the rear arms the furrow-side supporting-wheel D is applied, and to the front arms the plow-beam M is connected loosely by means of a bolt, $c^3$, passed through the arms and a slot in the beam.

The rear end of the beam M and the wing of the mold-board N are pivoted to the main frame A at $c^4$, and the extreme front end of the beam M is suspended upon the main frame A by means of a chain, $c^5$, or its equivalent, fastened to a lifting-pulley, $c^6$, of a windlass-shaft, D'.

With the construction described, the main frame A and auxiliary frame C are supported upon the wheels A' and $A^2$, and circular disks B, Fig. 7, or harrowing-teeth B, Fig. 28, while the plowing and cultivating operations are being performed, and upon the furrow-side wheel D and landside-wheels A' $A^2$, when the plowing and cultivating or harrowing operations are not being carried on.

The dotted lines of the mold-board N, and circular cutting disks or wheels B in Fig. 1 show the position of the mold-board and disks while the plowing and harrowing operations are going on, and the full black lines of the supporting-wheel D in the same figure show the elevated position of said wheel while plowing, and the dotted lines of this wheel and the full black lines of the mold-board show the position of these parts when the plowing ceases.

The wheel D, by being applied to the auxiliary frame C, and elevated with said frame while the plowing is going on, is kept from revolving against the plowed ground, and thus friction and draft are decreased. This wheel, however, serves as a gage or stop for preventing the circular disks or wheels at B, Fig. 1, or the harrowing-teeth at B, Fig. 28, or their equivalent, entering too deep into the plowed soil after being set for cutting or harrowing to a given depth.

The auxiliary frame C affords a very effective leverage by which to raise the plow, and also by which to cant its main frame in a direction toward the landside, and thereby throw the harrowing or cultivating contrivance B above the plowed soil, and depress the wheel D upon the same, as illustrated in the drawings, and the length of said leverage can be increased or decreased by setting the axle of the wheel D farther from or nearer to the pivotal transverse bar $c$.

A hand-lever, $D^2$, operating in conjunction with a locking-latch, $D^3$, is provided on the bar $c$, for effecting the operations of raising and lowering the plow and harrowing or cultivating contrivance thereof. A lever may be attached to the pulley $c^6$, for raising and lowering the front end of the plow-beam M, and thereby raising and lowering the plow and the harrowing or cultivating contrivance B, or its equivalent, and the wheel D; or an automatic draft mechanism, which will be presently described, may be employed for accomplishing the said operations.

An adjustable gage-stop, P, is pivoted upon the windlass-shaft D', and can be adjusted to any desired position with respect to the top of a forward cross-beam of the frame A, and fastened in such position by a set-screw, $p^7$. By means of this stop the depth at which the plowing is performed can be regulated, as desired, it simply being necessary to turn the stop upward or downward upon the windlass-shaft D', and thereby set it farther from or nearer to said beam of frame A.

The circular cutting disks or wheels at B, Figs. 1 and 7, may be made with a plane face, or with a dishing form, or in the form of a double-convex lens, or of any other suitable form. They are applied upon a shaft, B', which stands diagonal to the line of draft, as shown in Fig. 4 by full black lines, and also by the diagram, Fig. 7.

The shaft may be hung in a forked bearing, $b$, the stem $b'$ of which is screw-threaded for a portion of its length, and extends up through the main frame A, and receives on its many-sided upper end an adjusting and confining plate, $b^2$.

By having the stem screw-threaded the harrowing or cultivating devices attached to it may be set to harrow or cultivate the plowed soil to a greater or less depth, as occasion may require.

The cutting disks or wheels at B, Fig. 1, together with their shaft and bearing, or the harrowing-teeth at B, Fig. 28, with their shaft and bearing, or any equivalent contrivance for relieving the plow of landside-pressure, can be moved around in a horizontal plane, and confined in any desired position by means of a pin, $b^8$, inserted through any one of the many adjusting-holes $b^9$ of the plate $b^2$. The same parts can be set laterally nearer to or farther from the mold-board by placing the stem $b'$ in either of the holes $b^4$ of the main frame.

If the cutting disks or wheels at B and their shaft are set in the position shown by the dotted lines in Fig. 4 the convex faces of the disks must be reversed, and this can be accomplished by turning the bearing and shaft around, end for end. One of the disks—that farthest from the mold-board—is made, preferably, of less diameter than the others, in order that the highest portion of the adjacent turned-over furrow-slice shall be cut into at about an equal depth with the lower portions of said slice, and thus a uniform resistance will be offered by all the disks, and a more perfect leveling or harrowing of the soil effected.

The cutting wheels or disks may be made separate from the shaft and confined by shoulder-nuts, or they may be cast with the shaft, as illustrated in Fig. 13, or in any suitable manner.

When constructed as in Fig. 13 the shaft of these disks or wheels may be provided with a spindle-stem, p, at one end and a box or chamber, d', at its other end, and the spindle-stem d will befitted into an anti-friction-roller box, $d^2$, which is screw-threaded on its periphery and screwed into the supporting-bearing b, while the box end of the shaft will receive into its chamber a circle of anti-friction rollers and a spindle-stem, $d^3$, which latter is screwed into the supporting-bearing b. The two spindle-stems bear with their conical ends against rawhide pieces $d^9$, and run with very little friction, and by being encircled by friction-rollers $d^5$, tied together by ring-plates $d^{10}$, do not bind and wear as rapidly as when running in plain ordinary journal-boxes. Consequently the draft of the plow is lessened, while expense from undue wear and tear is avoided.

The box $d^2$ and the spindle $d^3$, by being screwed into the bearing-support b, afford a very convenient mode of applying the cutting disks or wheels to the plow, as well as facilities for removing and reversing their position as occasion requires.

In practice it may be found most desirable to make all the rolling shafts or axles of the plow, except those set on the curved surface of the mold-board, with two spindles or stems, d, one at each end, and to provide an anti-friction-roller box, $d^2$, at each end, as shown in Fig. 30. The rear landside supporting-wheel, A', is set on a shaft, $A^4$, which inclines upward toward the landside, and by this means this wheel is inclined over toward the furrow side of the plow, and the wheel $A^2$, which is on the landside also, is grooved on its periphery in order to take hold of the soil, and thereby relieve the front portion of the plow from side pressure.

By setting the cutting disks or wheels (shown at B, Figs. 1 and 7) oblique to the line of draft, or on a line diverging laterally in a forward direction from said line of draft, and having the wheel A' inclined toward the furrow side and the wheel $A^2$ grooved or made hollowing on its periphery, the pressure of the plow on the landside is almost entirely obviated or balanced, and at the same time the adjacently-turned-over furrow-slice is cut up and harrowed by the cutting disks or wheels, and thus the plow, while doing both plowing and cultivating or harrowing operations, will run as easy in its draft as though simply plowing, and perhaps with less friction or resistance.

In Figs. 27 and 28 the bearing-support b b' is provided with harrow-teeth or cultivator-teeth, in style of small mold-board plows, as shown at B. These teeth may be applied to a bar, as at B', said bar being arranged either at right angles or oblique to the line of draft, such harrow-teeth being substituted as one equivalent of the rotary cutting disks or wheels at B in Fig. 12; and it is plain that with this contrivance (shown in Figs. 27 and 28) the landside-pressure of the plow will be relieved, and also that the soil will be harrowed or cultivated at the same time that the plowing is being performed.

It is deemed most desirable to employ the rotary cutting disks or wheels for the purposes mentioned, as they run with a lighter draft.

This improvement for relieving the landside-pressure and plowing and turning over the soil, and then harrowing or cultivating the plowed soil, is of great importance, and its principle is this: to combine an ordinary plow with a harrow or cultivator in such a manner that the soil turned over by the plow shall be afterward penetrated by the harrowing or cultivating implement to a depth less than that of the furrows plowed, and by such penetration of the harrowing implement the pulverization or breaking up of the plowed soil and also a relief of the plow from landside-pressure shall be effected, such relief from landside-pressure being accomplished by the soil coming in contact with surfaces which stand oblique or diagonal to the line of draft; and the parts employed for accomplishing these results may be any ordinary plow and any ordinary harrow or cultivator, the latter set or constructed to press against the plowed soil on a line diverging outwardly and forwardly, and its teeth penetrating any depth less than that of the plowed furrows, such being equivalents of the invention shown at B. This feature of my invention, therefore, is not confined to the particular form or shape of means shown for effecting the throwing of the soil by harrowing toward or away from the mold-board of the plow, as such means are only shown as incidental to the invention described, and as illustrating some of the capabilities of the invention.

Directly over the rotary cutting disks or wheels shown at B, Figs. 1, 7, and 12, a seed-distributer, E E', is arranged upon the lateral branch of the main frame A. The shaft of this distributer is driven by a band, F, running over a loose clutch-pulley on the shaft o distributer E', and a fast pulley on axle $A^4$ of the rear supporting-wheel, A', and when the clutch-pulley is moved in gear with a clutch of the shaft of the seed-distributer the dropping of the seed will take place—that is, when the plow is moving. This arrangement is such that the plowing and harrowing may be performed either with or without planting the seed, and if planting is being performed the feed of the seed may be automatically stopped or started by the stopping or starting of the plow. With this seeding attachment added to the plow the threefold operation of plowing, harrowing, and planting can be simultaneously carried on.

Through the curved portions of the mold-board N sharp or edged wheels f are set, and made to extend out beyond the top surface of the mold-board. These wheels are provided with shafts, which may run in anti-friction boxes, as shown in Fig. 13, said shafts extending upward in an inclined position and having their upper ends fitted in screw-threaded boxes $e^2$. By means of these wheels the furrow-slice, in moving over the mold-board N, is prevented from gliding off before it is turned over, and thus very thin and narrow furrow-slices may be plowed and inverted. These wheels may be set in any position desired, and in some cases they may stand diagonal to the line of draft, in order to serve as comminutors of the soil; but their main purpose is to press the soil upward until the furrow-slice is turned over.

The mold-board N, share N', and point $N^2$ are united by means of lapping-extensions $g$, formed, respectively, on them, as shown. On the point portion $N^2$, between its extensions $g$, a curved extension, $g'$, equal in thickness to the plate, is provided, and this extension fits a corresponding seat-notch, $g^7$, formed in the lapped edge of the mold-board, at a point between its extensions $g$. Directly under the extension $g'$ a bar, $g^2$, having a screw-stem on its rear end, is provided, and this bar passes through a lug, $g^3$, of the mold-board, and receives a nut, $g^4$, on its end. By this bar the point is drawn to and confined in its position.

On the under side of the share an arm, $h$, is formed, said arm being provided with a thickened portion, $h'$, which fits into a rectangular or other suitable notch, $g^8$, formed in the lapped edge of the mold-board. The rear thinner portion of this arm is provided with an oblong slot, $h^2$, the side walls of which are under-beveled, so as to give a dovetail form to the slot. This slot receives into it a dovetailed lug, $g^9$, formed on the under side of the mold-board.

The share N' and point $N^2$ may be in separate pieces or united in one piece, and in either construction the draft upon the screw-bar, by the nut on its end, will firmly unite the share and point to the mold-board.

One advantage of the special construction of fastening shown is that the parts can be cast by the most simple and ordinary modes. The full thickness of the portions at the points where the notches, slotted arm, and screw-bar are provided obviates the necessity of employing cores in the casting process.

The colter Q of the plow is similar in construction to any of the thin circular-disk colters heretofore used, except as follows: On each side of the eye of the colter-blade elastic cushions or bearings $m$ are provided. These cushions are made, preferably, in form of rubber disks, and they are designed to permit lateral play on either side of the blade when any obstruction which would bend or break the thin disk comes in contact with the colter; and above the pivot of the hanger or bearings lever-extensions are formed on the bearings, and said extensions $n$ are united together by a self-adjusting head-block, $n^2$, or equivalent means. Between this head-block and a lug or abutment, $n^2$, on the plow-beam a cushion or spring, $n'$, is fitted. This cushion is made, preferably, in form of an india-rubber cylinder or block having a sustaining and guiding rod passed centrally through it and connected to the head-block. The yielding-blocks $m$ and $n'$ permit the colter to yield backward and upward when a formidable obstruction meets it, and thus breakage or bending of the circular disk is prevented.

In case the obstruction causes a backward and oblique or lateral deflection of the disk or blade the two sets of yielding blocks or cushions $m$ and $n'$ will permit these united movements.

Any other equivalent yielding means for permitting the movements of the colter may be substituted for the rubber blocks or spring-cushions.

The driver's seat I of the plow is hung upon a spring, $p$, placed around a pendent rod, $p'$, of an arched standard, $p^2$. The stay-bar $p^3$ of the seat extends back and passes loosely through an eye, $p^4$, and on this bar, between the eye and a shoulder, $p^6$, of the bar, another spring, $p^5$, is applied. By this arrangement of the seat it is free to swing laterally and longitudinally, and to move up and down, and the driver is thus provided with a very comfortable position upon the plow, the seat preserving its proper relation to the horizon while the plow-frame is following the undulations of the ground on either side and at front and rear.

On one of the sides of the seat a rest or arm R, is pivoted and made adjustable in a horizontal plane, and on this rest an umbrella or other article can be placed and be supported, as illustrated in the drawings. The described spring-seat is an improvement on the plan shown in Letters Patent No. 216,415 and No. 215,929, granted to me in 1879.

The mechanism employed for raising and lowering the plow by the draft of the team is as follows: The front supporting-wheel, $A^2$, has the stem J of its supporting-hanger J' arranged to turn in a horizontal path in a laterally-sliding bearing, $J^2$, said bearing being adjustable in its supports, and it is confined in its positions by means of a set-screw, $J^4$. With this adjustable bearing the tongue can be set so as to secure a center draft with respect to the plow and its appliances. The stem J is provided with upwardly-extended supports $q$, for the pivot $q'$ of the tongue or pole K to pass through and turn in, said supports being forward of the center of the stem and having arranged between them a guiding friction-roller, $q^3$, for the lower draft-chain to move over when the tongue is being turned around horizontally on the stem J, or up and down vertically on the pivot $q'$. The forward set of the supports avoids binding of the parts in turning the tongue around. The tongue K at its rear end is tubular, as indicated at $k$, and into this tubular part the pivoted section or part $k'$ is fitted to slide loosely. The section $k'$ is formed of two side bars connected together by suitable transverse bolts, and it is pivoted to the supports $q$ by the pivot $q'$, as shown.

L and L', Fig. 15, are wheels attached to the bars of section $k'$, and $l$ is a draft-chain drum between the wheels L. The wheels L are toothed on their periphery, while that L' is plain. The wheel L' bears against the top and bottom of the tubular part $k$ of the tongue, and thereby supports as well as guides the wheels L and the part $k'$ of the tongue while the operation of raising and lowering the plow is going on. The wheels L are united together by the drum $l$, and their teeth gear with the rack $L^2$, formed in the tubular part of the tongue; and thus, when the tongue K is drawn forward or moved backward by the team, the wheels L turn with a positive movement.

To a bolt at the rear end of the tongue a windlass-chain, $l'$, or its equivalent, is fastened, and carried back between two grooved horizontal pulleys, $l^2$, of the part $k'$ of the tongue, and fastened to a drum, $l^5$, on the windlass-shaft D'. Another windlass-chain, $l^7$, or its equivalent, is fastened to the drum $l$ of the wheels L, and carried back under a guide-pin and over the roller $q^3$, and fastened to another drum, $l^3$, of the windlass-shaft D'.

To the windlass-shaft, on each side of the drum $l^3$, a circular ratchet-wheel, $l^4$, is fastened, and into the teeth of these ratchet-wheels a foot or hand lever pawl, $l^6$, is arranged to work for the purpose of fastening and releasing the windlass-shaft. A spring beneath the pawl keeps it in action when the foot is withdrawn from it.

With this construction of the draft pole or tongue a plow can be raised and lowered by the team when the pawl $l^6$ is raised out of contact with the ratchet-wheels $l^4$, but not otherwise, and this raising and lowering of the plow can be effected whether the tongue is in the line of the plowshare or turned around out of such line. The mechanism, also, is such that it permits the tongue to swing around and up and down, as usual.

In raising the plow the tubular part $k$ of the tongue slides forward and causes the windlass-chain $l'$ to unwind from drum $l^5$, and the chain $l^7$ to wind on drum $l^3$; and in lowering the plow the operation is just the reverse with respect to the respective draft-chains.

When the plow has been raised by the mechanism described its further elevation is effected by the wheel A' rising out of the furrow on a plane with the wheel A² as the plow is moved forward. Any other equivalent mechanism to that herein described may be employed for the purpose of raising the plow and also lowering it.

M' is a rubber or yielding cushion on the front beam of the main frame and directly under the tongue or pole K. This cushion serves for relieving the team from sudden jars as well as the weight of the tongue. Any other equivalent of this cushion may be employed for the purpose stated.

It is contemplated, with the invention described herein, to employ plowshares and mold-boards which are provided with a landside, as well as those not working with a landside.

In the operation of plowing in soft and sandy soil it is often found difficult for the mold-board to turn over the furrow-slice, and the circular cutters at B, or their equivalents, in such plowing may be set in the reversed position shown by dotted lines in Fig. 4, and thus serve effectually for aiding in turning over such furrow-slices, and to effect this reversal of the position of the cutting disks or wheels at B it is not absolutely necessary to take the shaft with the disks or wheels out of the supporting-bearings, as this may be accomplished by loosening and turning around the stem of the bearings and again fastening it with the adjusting plate and pin.

All of the circular disks or wheels at B may, if desired, be of the same diameter.

The contrivance, as at B, for relieving the plow from friction due to pressure of the landside is of great utility, as it enables the plow to run with lighter draft, and the means employed for effecting the object answer at the same time for harrowing or cultivating the soil, and thus, by once passing over it, the soil is prepared for the reception of seed; and the combinations are such that the seed can be, if desired, planted during the preparation of the soil.

Two or more plows may be provided on the same frame, and each of such plows will be provided with a contrivance or device, as at B, or the equivalent thereof, for relieving it of landside-pressure, and for harrowing or cultivating the soil which is being plowed.

In some constructions of the mechanism for raising and lowering the plow by the draft of the team a single-toothed wheel with a drum on one side of it might be employed, and in some cases the plain wheel L' might be toothed and work in a rack-bar.

The friction-bearing boxes may be dispensed with, if desired.

In constructing the colters, it may be necessary, in some applications thereof to plows, to place the relief-spring $n'$ below the pivot of the hanger or bearings, in which case the form of the spring and the shape of the hanger will be changed to suit the necessities of the case, and it may be sufficient to apply an ordinary spiral spring between the beam and the hanger of the colter at a point below the pivot of the hanger, and such construction would be an equivalent of the plan shown in the drawings.

I do not confine my invention to any particular form of supports for colters, as the gist of this part of my invention is the interposition of yielding devices upon the colter for relieving it of undue strain. Nor do I confine my invention to any particular form of support for the devices for relieving the plow of pressure on the landside, as I believe myself to be, broadly, the first to have effected this object in a plow. Nor do I confine my invention for raising and lowering the plow by the draft of the team to the employment of the two draft-chains together, as the plow may be raised by the chain $l'$ alone, and this chain will wind upon the drum $l^5$ as the windlass is revolved by the weight of the plow when the team is backed. With such arrangement the wheels L and L' would then answer, if made plain, as their office would be simply to guide and support the section $k$ of the tongue in its sliding movements. Nor do I confine myself to the special forms of harrowing or cultivating devices or plows.

The equivalents of my invention for relieving landside-pressure and harrowing or cultivating the soil are any forms of cutting wheels or disks or rigid teeth set to resist the landside-pressure of one or more plows while the soil is being plowed and harrowed or cultivated.

What I claim as my invention, and desire to secure by Letters Patent, is—

1. The combination, with a main frame, A, of a plow having the mold-board attached to it, of an auxiliary frame, C, having forward extensions to which the plow-beam is attached, and rear extensions to which the furrow-side wheel is applied, said auxiliary frame being hinged intermediate its ends to the main frame, substantially as and for the purpose described.

2. In combination with a plow or plows, one or more harrowing or cultivating devices, as at B, or their equivalents, for relieving said plow or plows from pressure and friction on their landsides, and harrowing or cultivating the plowed soil simultaneously with the operation of plowing, substantially as set forth.

3. Cutting wheels or disks, or the equivalent thereof, as at B, of relatively large and small diameters or size, in combination with a plow, whereby the plowed soil is uniformly harrowed or cultivated, and also the pressure and friction on the landside of the plow are avoided, substantially as set forth.

4. In combination with a plow, the obliquely-set contrivance B, for relieving a plow of pressure on its landside, and a landside-bearing wheel, A', substantially as and for the purpose described.

5. In combination with a plow, the contrivance or device, as at B, for relieving a plow of pressure on its landside, the forward grooved wheel, $A^2$, and landside-bearing wheel A', substantially as described.

6. In a plow, the furrow-side bearing-wheel D, applied to an auxiliary frame, C, having a plow attached to it, in combination with disks or wheels, as at B, applied to a main frame, A, whereby the frames are supported on the furrow side by the disks or equivalent contrivance while plowing and harrowing are going on, and by the furrow-side wheel when the said operations cease and the plow and disks are raised out of the soil, substantially as described.

7. The mold-board N, having edged wheels $f$ extending up through its curved surface above the place where ordinary horizontal cutters have been applied, and in rear of and to one side of the place where an ordinary colter-cutter has been applied, said edged cutters serving for reducing friction, and also enabling the plow to cut narrow slices and hold them while they are being turned over, substantially as set forth.

8. The mold-board N, provided with lapping-extensions $g$, notches $g^7$ and $g^8$, and lugs $g^3$ and $g^6$, in combination with the share N', provided with a slotted arm, $h\ h^2$, lapping-extensions $g$, and a thickened portion $h'$, and with the point $N^2$, provided with lapping-extensions $g$, thickened extension $g'$, and a screw-threaded bar, $g^2$, passed through the lug $g^3$ of the mold-board, substantially as described.

9. An edged colter, Q, provided with laterally-yielding blocks or cushions $m$ at its center or hub, in combination with a plow, whereby it is allowed to yield laterally independently of the plow when it meets unyielding obstructions, substantially as described.

10. A rolling colter having an automatic back and upward movement and provided with a relief-spring, substantially as and for the purpose described.

11. In combination with a plow, an edged colter provided with yielding devices for relieving it of strain in both its upward and backward and its lateral movements, substantially as described.

12. A plow having its front bearing-wheel hanger extended upward to form supports which are forward of the center of the axial stem J of said hanger, substantially as and for the purpose described.

13. In a plow, the forward bearing-wheel, $A^2$, having the stem or shaft J of its supporting-hanger J' pivoted in a laterally-adjustable bearing, $J^2$, and extended upward beyond said bearing to form supports $q$ for a pivot, $q'$, of a draft tongue or pole, K, forward of the center of the vertical axis of said stem J, and for a guiding friction-roller, $q^3$, to rest in, in combination with a tongue or draft-pole, K, which is provided with grooved pulleys $l^2$, and is pivoted to said stem or shaft J, whereby the tongue and draft-chains $l'$ and $l^7$ are allowed movements in vertical and horizontal planes without liability of binding, substantially as described.

14. In a plow, the part or section $k'$ of the tongue or pole K, provided with a toothed wheel or wheels, L, or the equivalent thereof, and a drum, $l$, and with a plain supporting and guiding wheel, L', substantially as and for the purpose described.

15. In a plow, the combination, with the tongue or pole K, of the toothed wheel or wheels L, drum $l$, plain supporting and guiding wheel L', or its equivalent, pulleys $l^2$, roller $q^3$, draft-chains $l'$ and $l^7$, windlass-drums $l^3$ and $l^5$, ratchet wheel or wheels $l^4$, and pawl $l^8$, substantially as and for the purpose described.

16. The turning stem or shaft J of the hanger of the front supporting-wheel, $A^2$, provided with a guiding friction-roller, $q^3$, in combination with a hinged draft pole or tongue, K, provided with guide-pulleys $l^2$ forward of the axis of said stem or shaft J, substantially as described.

17. The combination of the part or section $k'$ of the draft-pole K, provided with guided and supported wheel or wheels L, and the outer tubular part $k$ of said tongue or pole provided with a rack, $L^2$, or its equivalent, for said wheel or wheels to gear with, substantially as described.

18. The combination of the part $k'$ of the draft tongue or pole K, provided with a guided or supported wheel or wheels, L, and the outer tubular part, $k$, of said tongue K provided with a rack, $L^2$, a windlass mechanism, and a plow, whereby the draft of the team can be employed in a very effective way for raising the plow, and the back movement of the team for lowering the same, substantially as described.

19. In a plow, the combination of the adjustable gage-stop P with the extensible tongue K and a windlass mechanism, whereby the depth to which the plow is automatically lowered is controlled, substantially as described.

20. In a plow, the gage-stop applied to the windlass-shaft D', in combination with the plow-frame and hinged plow, substantially as described.

21. In a plow, the combination of the stem J of the front wheel, $A^2$, laterally-adjustable bearing-block $J^2$, and the pole or tongue K, whereby the center draft of the plow and its appliances may be regulated, substantially as set forth.

22. In a plow, the spring-seat I, comprising the rearward extended stay-bar $p^3$, spring $p^5$, pendent rod $p'$, standard $p^2$, spring $p^5$, and guiding-eye $p^4$, substantially as and for the purpose described.

23. A removable box for journal-bearings having screw-threads on its outer surface for insertion into a hanger or frame, in combination with the revolving shafts or axles and the friction-rollers, substantially as shown and described.

24. The combination of the seed-planting mechanism, as at E E', with the main frame, auxiliary frame, oblique disks or wheels, as at B, or an equivalent contrivance for relieving the plow from pressure and friction on its landside and also harrowing or cultivating the soil, and a plow for turning over the soil, substantially as described.

THOMAS E. JEFFERSON.

Witnesses:
J. P. THEODORE LANG,
H. A. HALL.